(12) United States Patent
Wuorinen et al.

(10) Patent No.: US 12,703,370 B2
(45) Date of Patent: Aug. 11, 2026

(54) REST CONDUCIVE AUTOMATED VEHICLE OPERATION

(71) Applicant: GM Global Technology Operations LLC, Detroit, MI (US)

(72) Inventors: Alec M. Wuorinen, Columbus, OH (US); Craig Thomas Douglas, Pflugerville, TX (US); Matthew Edward Gilbert-Eyres, Rochester Hills, MI (US); Eric T. Hosey, Rochester Hills, MI (US); Russell A. Patenaude, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 18/638,089

(22) Filed: Apr. 17, 2024

(65) Prior Publication Data

US 2025/0326396 A1 Oct. 23, 2025

(51) Int. Cl.
*B60W 50/00* (2006.01)
*B60Q 3/70* (2017.01)
*B60W 10/30* (2006.01)
*B60W 60/00* (2020.01)

(52) U.S. Cl.
CPC ........ *B60W 50/0098* (2013.01); *B60W 10/30* (2013.01); *B60Q 3/70* (2017.02); *B60W 60/00133* (2020.02); *B60W 2540/22* (2013.01); *B60W 2720/10* (2013.01)

(58) Field of Classification Search
CPC ............ B60W 50/0098; B60W 10/30; B60W 60/00133; B60W 2540/22; B60W 2720/10; B60Q 3/70
See application file for complete search history.

(56) References Cited

U.S. PATENT DOCUMENTS 9,500,489 B1 * 11/2016 Ng .................... G01C 21/3461
11,904,893 B2 2/2024 Dubrovskiy et al.
12,054,163 B2 8/2024 Dadam et al.
2010/0179730 A1 * 7/2010 Hiemenz ........... B60N 2/42736 701/45

(Continued)

FOREIGN PATENT DOCUMENTS

DE 102017212111 A1 1/2019
DE 102019002265 A1 9/2019

(Continued)

OTHER PUBLICATIONS

German Application No. 10 2024 114 207.3 filed May 22, 2024; German Office Action dated Nov. 27, 2024; 6 pages.

*Primary Examiner* — Navid Z. Mehdizadeh
*Assistant Examiner* — Caitlin R McCleary
(74) *Attorney, Agent, or Firm* — CANTOR COLBURN LLP

(57) ABSTRACT

A method for operating a vehicle includes entering a rest mode and altering at least one vehicle condition to be more conductive to rest. The method identifies a body position of a first passenger and determines a first body vector from the body position to a first vehicle reference point. The method determines a travel route configured to minimize at least one rest disruption factor based at least in part on the first body vector and initiates the determined travel route.

18 Claims, 9 Drawing Sheets

(56) References Cited

U.S. PATENT DOCUMENTS

| | | | | |
|---|---|---|---|---|
| 2014/0200737 | A1* | 7/2014 | Lortz | B60R 25/25 701/1 |
| 2019/0258253 | A1 | 8/2019 | Tremblay | |
| 2020/0290647 | A1 | 9/2020 | Anderson | |
| 2020/0331501 | A1 | 10/2020 | Wirtz | |
| 2020/0369289 | A1* | 11/2020 | Isaku | B60W 40/08 |
| 2021/0164796 | A1* | 6/2021 | Larner | B60W 40/08 |
| 2022/0348116 | A1* | 11/2022 | Fukuyama | B60W 40/08 |
| 2024/0023816 | A1 | 1/2024 | Shouldice et al. | |
| 2024/0246567 | A1* | 7/2024 | Kume | A61B 5/18 |
| 2025/0108834 | A1* | 4/2025 | Singh | B60W 30/182 |

FOREIGN PATENT DOCUMENTS

| | | | |
|---|---|---|---|
| DE | 112017008231 | T5 | 8/2020 |
| DE | 102020127394 | A1 | 4/2021 |
| DE | 102021202123 | A1 | 9/2022 |
| DE | 102021133534 | A1 | 1/2023 |

* cited by examiner

REST CONDUCIVE AUTOMATED VEHICLE OPERATION

INTRODUCTION

The subject disclosure relates to autonomous and semi-autonomous vehicle operation, and more particularly to a process for automatically operating a vehicle in a manner conducive for rest of at least one passenger.

During long trips it is common for one or more vehicle passengers to sleep or otherwise rest for a substantial duration of the trip. Certain vehicle conditions and operations are counter-productive to providing restful conditions while at the same time efficiently performing standard vehicle operations. By way of example, interior lighting is less conducive to rest, but a minimum level of interior lighting may be required to operate the vehicle.

As autonomous and semiautonomous vehicle operations become more common, greater automatic control over the vehicle conditions and operations can be exerted, and less manual control is required. This can, in some cases, allow for conditions to be better adjusted for passengers to rest without comprising operational control of the vehicle.

As such, it is desirable to provide a system that enables operating the vehicle in a manner conducive to rest for one or more passenger without compromising primary vehicle operations.

SUMMARY

In one exemplary embodiment a method for operating a vehicle includes entering a rest mode and altering at least one vehicle condition to be more conducive to rest. The method identifies a body position of a first passenger and determines a first body vector from the body position to a first vehicle reference point. The method determines a travel route configured to minimize at least one rest disruption factor based at least in part on the first body vector and initiates the determined travel route.

In addition to one or more of the features described herein wherein the body position is a center of a forehead and the vehicle reference point is a position on a headrest.

In addition to one or more of the features described herein, the method further includes identifying the body position of a second passenger and determining a second body vector from the body position of the second passenger to a second vehicle reference point.

In addition to one or more of the features described herein determining the travel route includes identifying a plurality of potential travel routes, identifying an estimated force vector of each turn of each potential travel route in the plurality of potential travel routes, and selecting the travel route from the plurality of potential travel routes based at least in part on a total opposing force vector between the force vectors of each potential travel route and the first body vector.

In addition to one or more of the features described herein the total opposing force vector of each potential route discounts all force vectors below a threshold magnitude.

In addition to one or more of the features described herein the threshold magnitude is a static threshold stored in a vehicle memory.

In addition to one or more of the features described herein the threshold magnitude is a dynamic threshold dependent at least in part on a magnitude of the first body vector.

In addition to one or more of the features described herein selecting the route is based at least in part on one or more of an expected average speed of each potential route, an expected average roughness of each potential route, an expected noise level of each potential route, and an expected consistency of travel of each expected route.

In addition to one or more of the features described herein altering at least one vehicle condition includes at least one of altering an interior lighting of the vehicle, altering an interior volume of the vehicle, altering a speed of the vehicle, and altering an aggressiveness of at least one automated vehicle system.

In addition to one or more of the features described herein altering the interior volume includes at least one of lowering an audio output volume, playing a white noise, and actively canceling an exterior noise.

In addition to one or more of the features described herein altering the at least vehicle condition further includes communicating with at least one third party device, thereby causing the at least one third party device to alter a third party device setting.

In addition to one or more of the features described herein determining the travel route further comprises identifying a targeted arrival time and wherein the travel route maximizes expected travel time while completing the travel route prior to the targeted arrival time.

In addition to one or more of the features described herein, the method further includes receiving at least one additional vehicle condition alteration from the first passenger and storing the at least one additional vehicle condition alteration in a memory such that subsequent iterations of the method apply the at least one additional vehicle condition.

In addition to one or more of the features described herein, the method further includes determining a unique identity of the first passenger and wherein altering the at least one vehicle condition to be more conducive to rest comprises determining rest mode settings of the first passenger using the unique identity of the first passenger and applying the rest mode settings of the first passenger to the vehicle.

In addition to one or more of the features described herein determining the travel route configured to minimize at least one rest disruption factor based at least in part on the first body vector comprises identifying a plurality of potential travel routes, calculating a rest score of each potential travel route, and selecting a potential travel route having a best rest score as the travel route.

In another exemplary embodiment a vehicle includes a controller having at least one automated vehicle operation system configured to cause the controller to perform a method including the steps of entering a rest mode and altering at least one vehicle condition to be more conducive to rest, identifying a body position of a first passenger and determining a first body vector from the body position to a first vehicle reference point, determining a travel route configured to minimize at least one rest disruption factor based at least in part on the first body vector, and initiating the determined travel route.

In addition to one or more of the features described herein wherein the body position is a center of a forehead and the vehicle reference point is a position on a headrest.

In addition to one or more of the features described herein determining the travel route comprises identifying a plurality of potential travel routes, calculating a rest score of each potential travel route, and selecting a potential travel route having a best rest score as the travel route.

In addition to one or more of the features described herein determining the travel route includes identifying a plurality of potential travel routes and identifying an estimated force vector of each turn of each potential travel route in the plurality of potential travel routes, and selecting the travel route from the plurality of potential travel routes based at least in part on a total opposing force between the force vectors of the route and the first body vector.

In addition to one or more of the features described herein the total opposing force vector of each potential travel route discounts all force vectors below a threshold magnitude.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
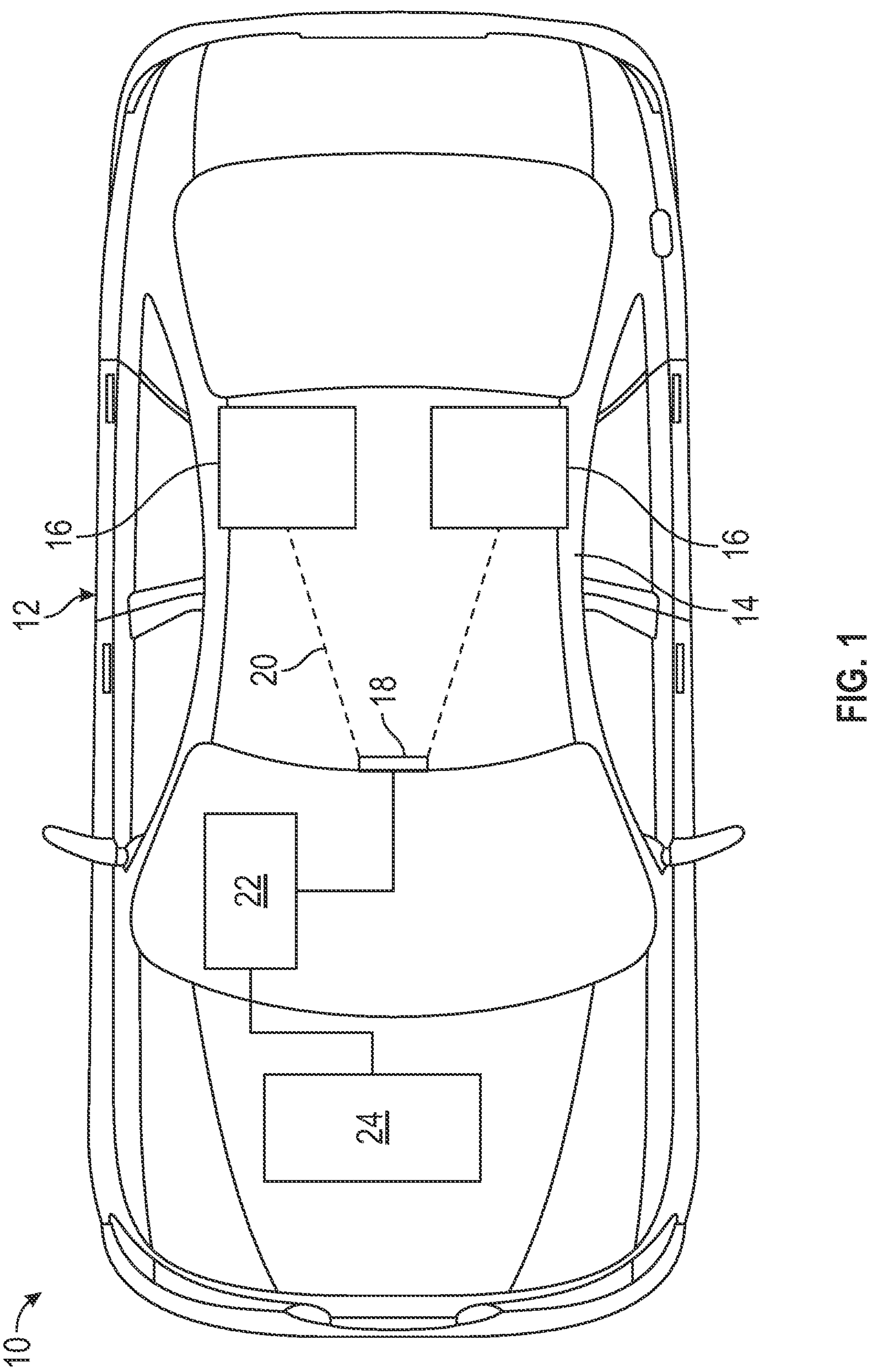
FIG. 1 is a top schematic view of a motor vehicle including a control process configured to operate the vehicle in a manner conducive to rest.

The following description is merely exemplary in nature and is not intended to limit the present disclosure, its application or uses. It should be understood that throughout the drawings, corresponding reference numerals indicate like or corresponding parts and features.

In accordance with an exemplary embodiment methods, devices and systems are provided for identifying one or more resting passengers in a vehicle and responding to the identification by placing the vehicle in a rest mode. The rest mode alters physical conditions within the vehicle (e.g., reducing lighting and volume).

In addition, the rest mode identifies a body position of the one or more vehicle passengers relative to a reference point within the vehicle. Based at least in part on the vector from the body position to the reference point, the vehicle determines a travel route that is configured to minimize rest disruption by minimizing forces opposing the vector, as well as minimizing external factors that may be disruptive to resting.

As used throughout, a vehicle passenger is any person within the vehicle that is not actively operating the vehicle and can include a passenger designated as the "operator" in a fully autonomous vehicle.

Embodiments described herein present numerous advantages and technical effects. Included among the benefits and technical effects are increased passenger comfort and rest which can lead to a more enjoyable travel experience.

The embodiments disclosed herein are not limited to use with any specific vehicle and may be applicable to various contexts. For example, automatically monitoring passengers and entering a rest mode may be applied to other vehicle types including busses and any similar free routing mass transport (e.g. transportation that is not limited to a predefined specific route), chauffeur vehicles including distinct passenger compartments, and the like.

FIG. 1 shows an embodiment of a motor vehicle 10, which includes a vehicle body 12 defining, at least in part, an occupant compartment 14. Within the occupant compartment 14 are at least two seats 16 in which passengers may ride. A camera 18 captures a field of view 20 including both of the seats 16. While represented as a singular camera 18, it is appreciated that the camera 18 may include multiple distinct imaging devices disposed throughout the interior of the occupant compartment 14 and able to provide a full view of each seat 16, as well as the corresponding occupant's within the occupant compartment 14. In some implementations, the cameras represented by camera 18 includes every potential seat 16, including that of the vehicle operator, within one or more fields of view 20.

The vehicle body 12 also supports various vehicle subsystems including a propulsion system, and other subsystems to support functions of the propulsion system and other vehicle components, such as a braking subsystem, a suspension system, a steering subsystem, a fuel injection subsystem, an exhaust subsystem and others.

The vehicle 10 further includes a vision systems controller 22 communicatively connected to the camera 18 and able to receive and process images generated by the camera 18. In the illustrated embodiment the vision systems controller 22 is a stand alone controller connected to a general vehicle controller 24, and the general vehicle controller 24 is able to exert control over various systems within the vehicle 10. In alternate embodiments, the vision systems controller 22 can be one or more software modules within the general vehicle controller 24 and provide the same operations. In yet other embodiments, both the general vehicle controller 24 and the vision systems controller 22 can be software modules across multiple distributed controllers, including overlapping controllers, with the multiple distributed controllers in communication with each other and operating cooperatively.

The vision systems controller 22, or the general vehicle controller 24 includes a rest optimization feature that identifies a resting passenger and optimizes vehicle travel for the resting passenger. As used herein "resting" is inclusive of sleeping, relaxing, and/or similar states.

Figure 2:
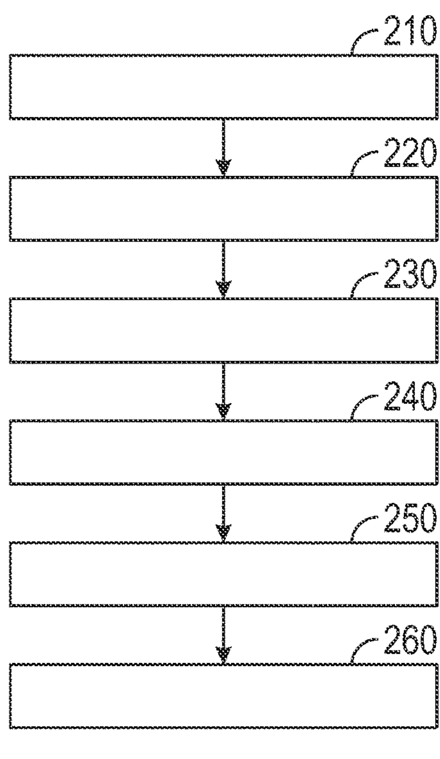
FIG. 2 depicts a high level flow chart illustrating the control process for operating the vehicle in a manner conducive to rest.

With continued reference to the vehicle of FIG. 1, FIG. 2 depicts a high level flow chart illustrating a control process for operating the vehicle 10 in a manner conducive to rest. The control process can be engaged by either or both of the general controller 24 and the vision systems controller 22. Initially the system detects one or more passengers in the vehicle resting and enters a rest mode of operations in a Trigger Rest Mode step 210. The detection can be triggered via a manual vehicle operator entry (e.g., via a infotainment screen entry) or via image analysis detecting that one or more passengers is resting.

Upon entering the rest mode, the control process alters conditions within the vehicle 10 to be more conducive to resting in an Alter Conditions step 220. The condition alterations make the occupant compartment 14 more conducive to rest by dimming lights, reducing volumes, raising or lowering window shades, placing vehicle screens in a dark mode, and/or any similar alterations.

Figure 3:
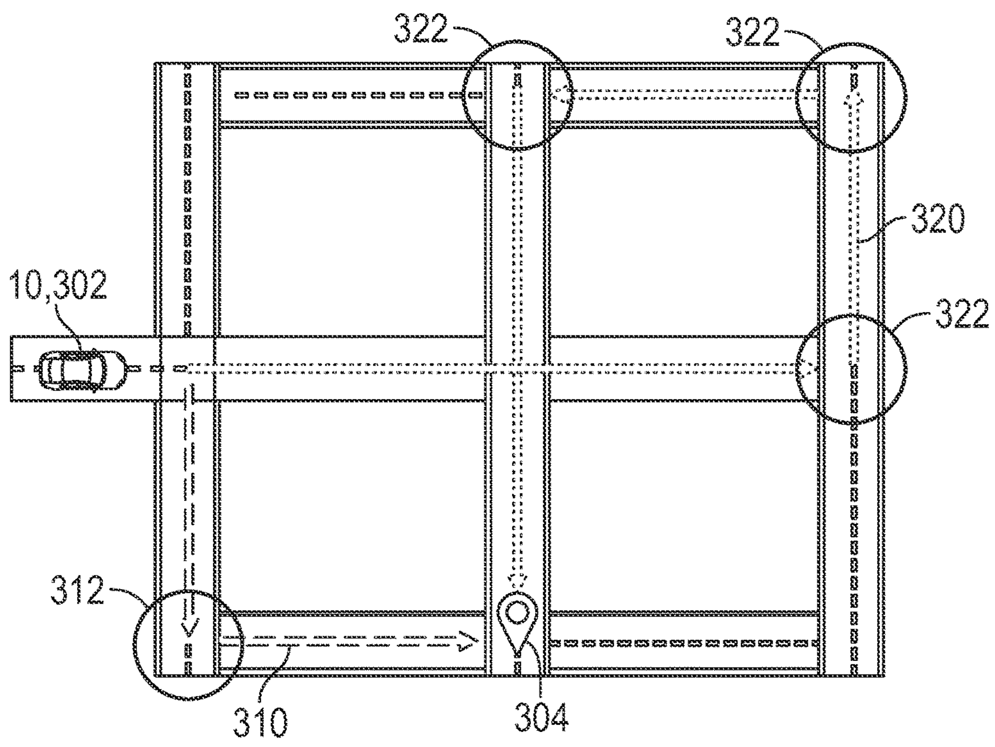
FIG. 3 depicts a set of two possible routes to a destination.
Figure 4:
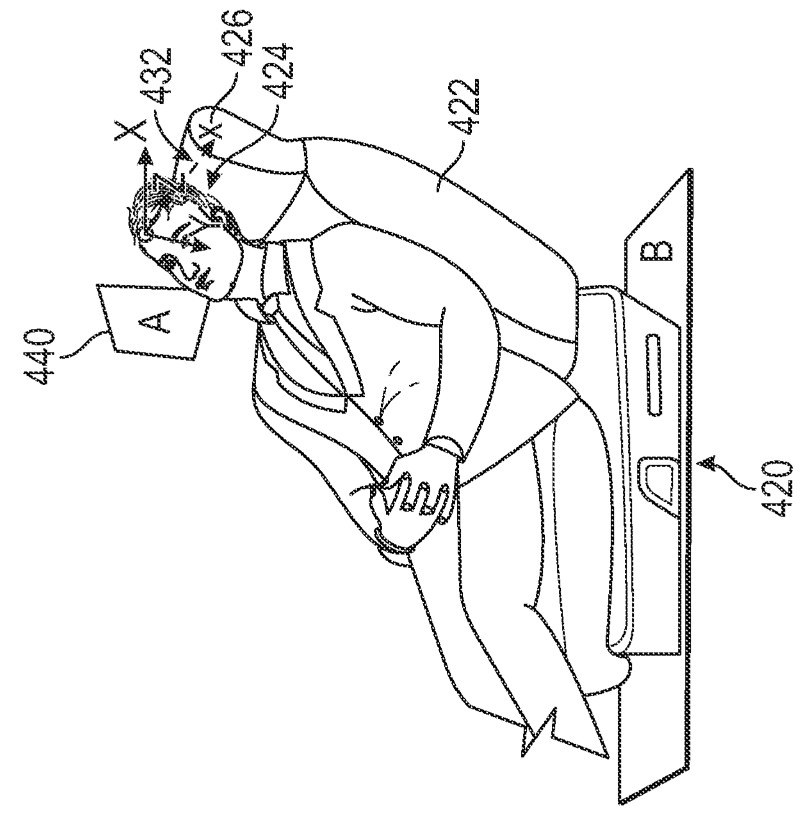
FIG. 4 depicts resting passengers within a vehicle.
Figure 4:
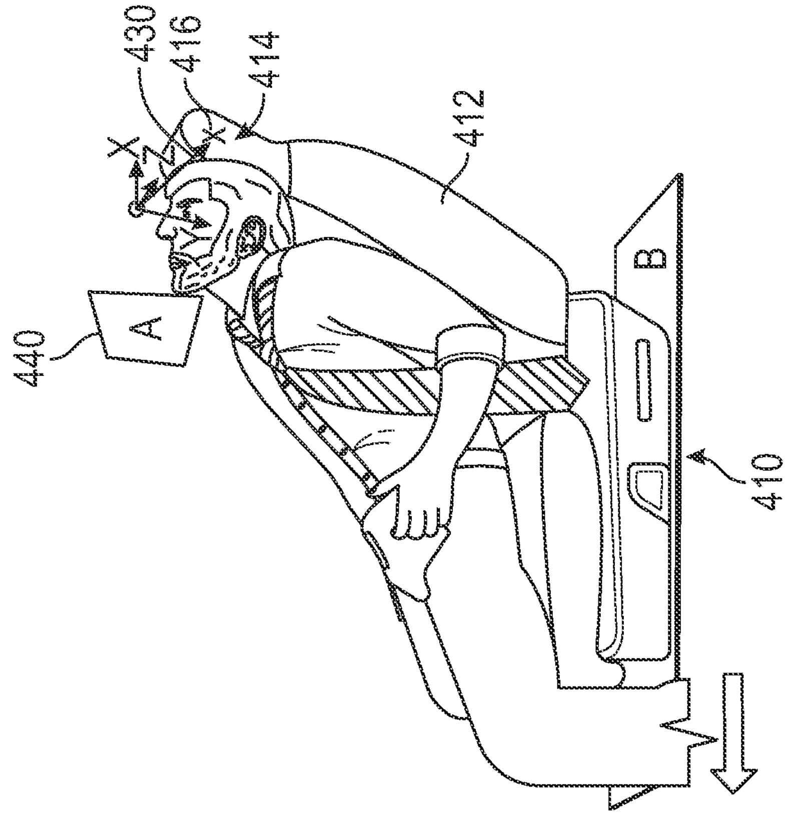
Figure 5A:
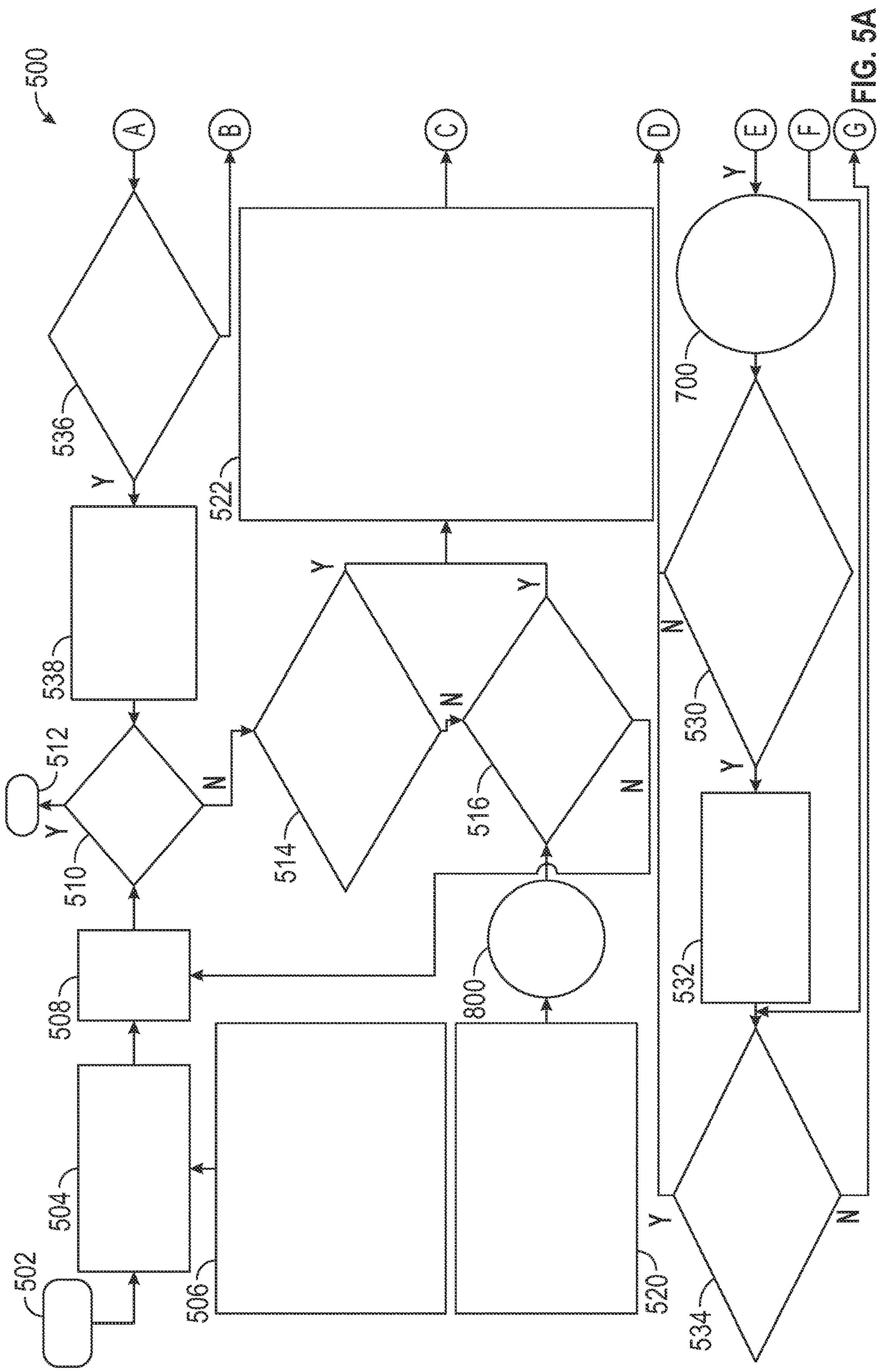
FIGS. 5A and 5B depict one detailed example embodiment for operating the vehicle in a manner conducive with resting.
Figure 5B:
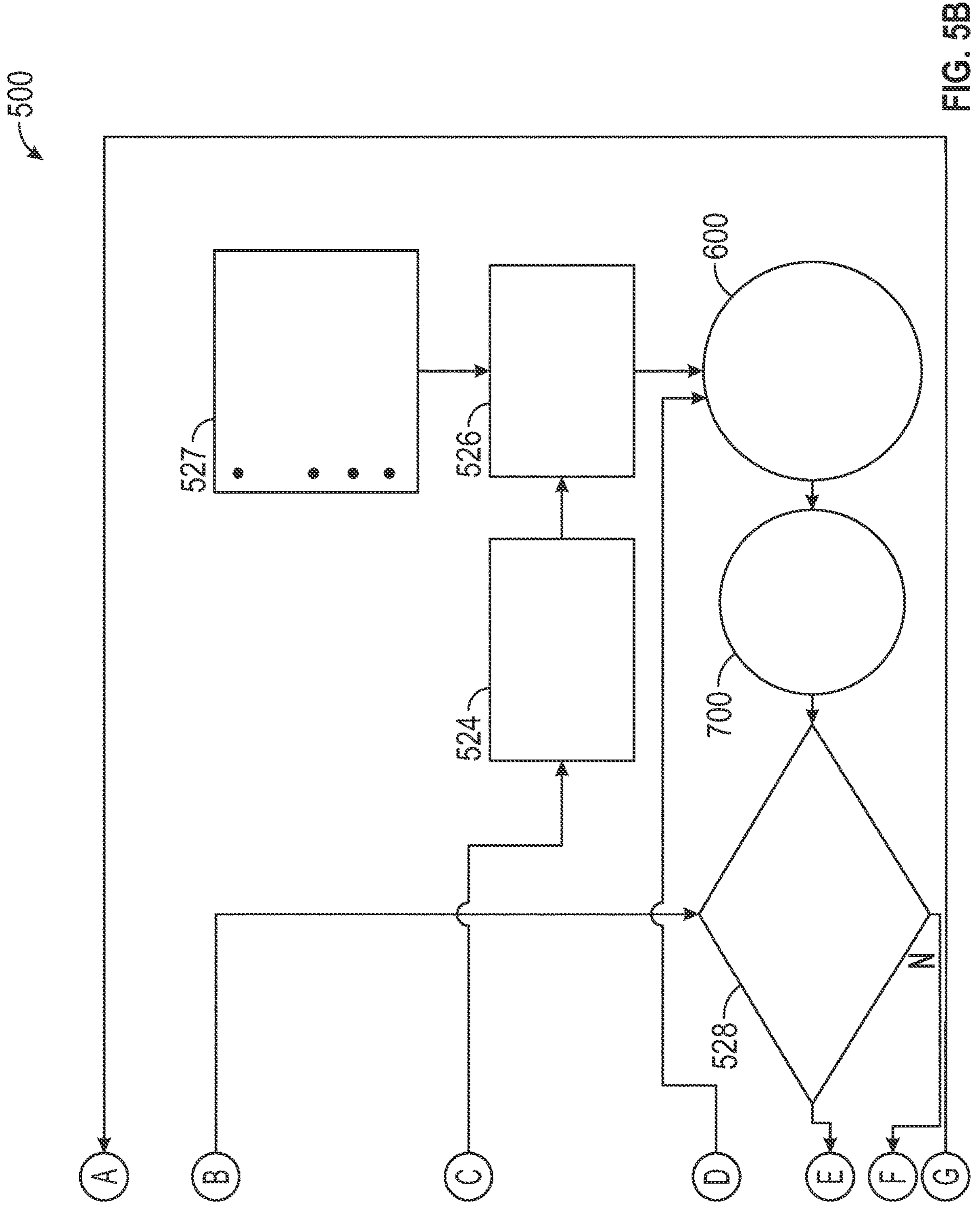

Referring to FIG. 3, after the initial condition alterations occur, or simultaneously with making the alterations, the process identifies potential routes 310, 320 from a current position 302 to a destination 304 in an Identify Potential Routes step 230. In the illustrated example, a single alternate route 320 and a primary route 310 are identified, with the primary route 310 being the route 310 determined using a "standard" method, and the alternate route 320 being representative of less efficient routes that achieve the same result (arrival at the destination 304). Each route 310, 320 includes one or more turns 312, 322 where the vehicle 10 will adjust course if the route 310, 320 is implemented. In practical implementations, substantially more than two distinct routes are identified and utilized in the process.

Once each route 310, 320 has been determined a rest score is calculated for each route 310, 320 in a Determine Rest Scores step 240. For each route 310, 320 multiple factors impacting passenger rest along the route are compiled into an overall rest score. The rest score is a numerical value and allows the routes 310, 320 to be compared to determine a best route. In some examples, features of a route that are conducive to rest (e.g., low expected noise, consistent travel speed, minimal turns jostling the resting passenger, etc.) are provided a high score, and the highest rest score is the best. In alternative implementations, the rest score may be inverted, with highly disruptive features (e.g. construction zones, high frequency start and stop, many turns jostling the passenger) being given a high score, and the lowest rest score is the best.

In some embodiments, a factor in determining the rest score for each route is the number of turns opposing a body vector of the resting passenger(s). With continued reference to FIGS. 1-3, FIG. 4 illustrates two exemplary passengers 410, 420 resting within corresponding vehicle seats 412, 422. Each vehicle seat 412, 422 includes a headrest 414, 424 and a corresponding reference point 416, 426 is defined on the headrests 414, 424.

Using the vision systems controller 22 a vector 430, 432 is drawn from the reference point 416, 426 to the corresponding passenger 410, 420. In some examples, the vector can be drawn from the reference point 416, 426 to the nearest position on the body of the passenger 410, 420. In other examples, the vector 430, 432 is drawn from a specific body position (e.g. a center of the forehead, an ear, etc.) to the reference point 416, 426. The vector 430, 432 is drawn relative to an arbitrary plane 440. The vector 430, 432 is referred to as a body vector of the passenger 410, 420. The body vector 430, 432 is, in turn, utilized to calculate the rest score by comparing each body vector against opposing vectors generated by executing each of the turns 312, 322. The route with the greatest average forces opposing the body vector(s) 430, 432 will have the worst rest score for force vectors. In some examples, turns having a force vector below a certain threshold (e.g. gradual turns, or turns approximately matching the body vector(s) 430, 432 are discarded from this analysis and only turns having a substantial impact on rest are included.

In some alternate examples, the vehicle reference point 416, 424 may be a position that is not on the corresponding seat 412, 422. By way of example, the vehicle 10 reference positions may be from a center of the vehicle, a corresponding window position, on which the passenger 410, 420 is resting their head, or any similar position.

In some additional examples, the score may be based at least in part on an expected average speed of each potential route 310, 320, an expected average roughness of each potential route, an expected noise level of each potential route, and an expected consistency of travel of each expected route. As used herein the expected consistency of travel refers to how often and/or how frequently the vehicle 10 will need to start and stop along the route due to any number of reasons including traffic flow, stop lights and signs, construction, etc.

Once the rest score has been determined for each route, the best rest score is identified and the corresponding route is selected as the best route in an Identify Best Route step 250.

After selecting the best route 310, 320, the selected route is initiated in an Initiate Travel step 260 and the process maintains the rest mode conditions for a duration of the travel.

With continued reference to FIGS. 1-4, FIGS. 5A and 5B illustrates one detailed example process 500 by which the general process of FIG. 2 can be implemented. It is appreciated that variations on the process 500 may be implemented while still falling within the scope of one or more embodiments of the process described herein.

Initially, the trip starts at a Trip Start step 502 after which the passengers 410, 420 or operator input a trip itinerary at an Input Trip Itinerary step 504. The trip itinerary includes a destination and required time of arrival. In examples where the operator is manually engaging the rest mode, the trip itinerary can include additional preference inputs 506. The preference inputs can include, among other preferences, a preferred rest length, a preferred rest temperature, a preferred rest darkness, a preferred rest noise level, a preferred wake up routine, information regarding whether the passenger 410, 420 is a heavy or light sleeper, and the like.

After all preferences have been entered, and the Input Trip Itinerary step 504 has been entered, the vehicle 10 determines a route to the destination 304 via any conventional route determination and begins driving at a Vehicle Drives step 508. As the vehicle 10 drives, the process 500 continuously checks to determine if the destination has been reached at a Destination Reached check 510.

In the event that the destination has been reached, the vehicle 10 stops operating, and the process ends at an End step 512.

In the event that the destination has not been reached, the process 500 checks to determine if a rest mode has been manually engaged in a Manual Rest Mode check 514. If no passenger has manually entered a rest mode, the process 500 proceeds to use automated analysis to determine if a passenger is resting in an Automated Rest check 516. The Automated Rest check 516 occurs using an automated rest check subprocess 800, one example of which is illustrated in FIGS. 8A and 8B, and can account for inputs 520 of heartrate, breathing body and head positioning, shifting and movement, and any other passenger factors that may be determined using image analysis from the camera(s) 18.

Figure 8A:
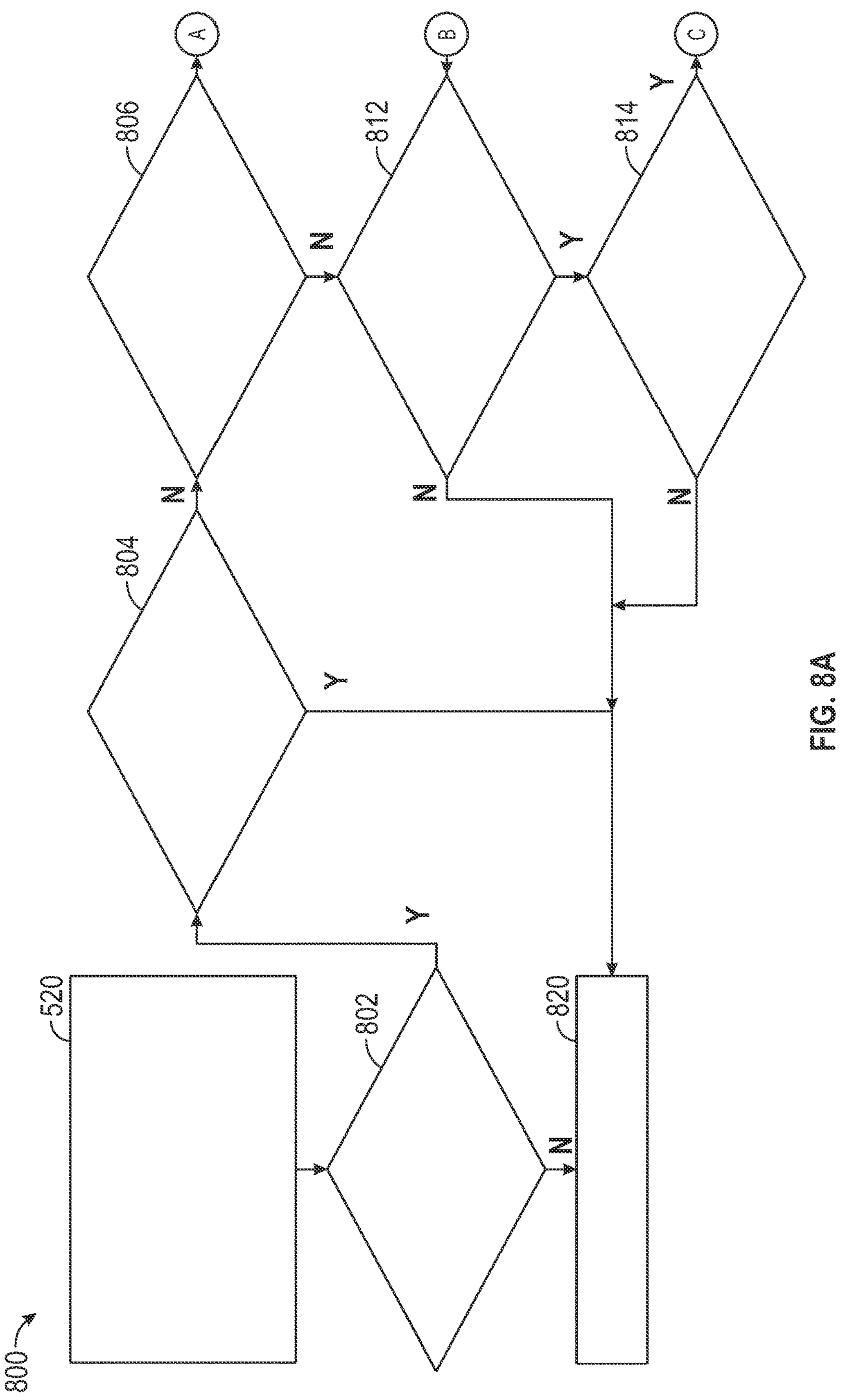
FIGS. 8A and 8B depict an exemplary process for determining if a passenger is resting according to one embodiment.
Figure 8B:
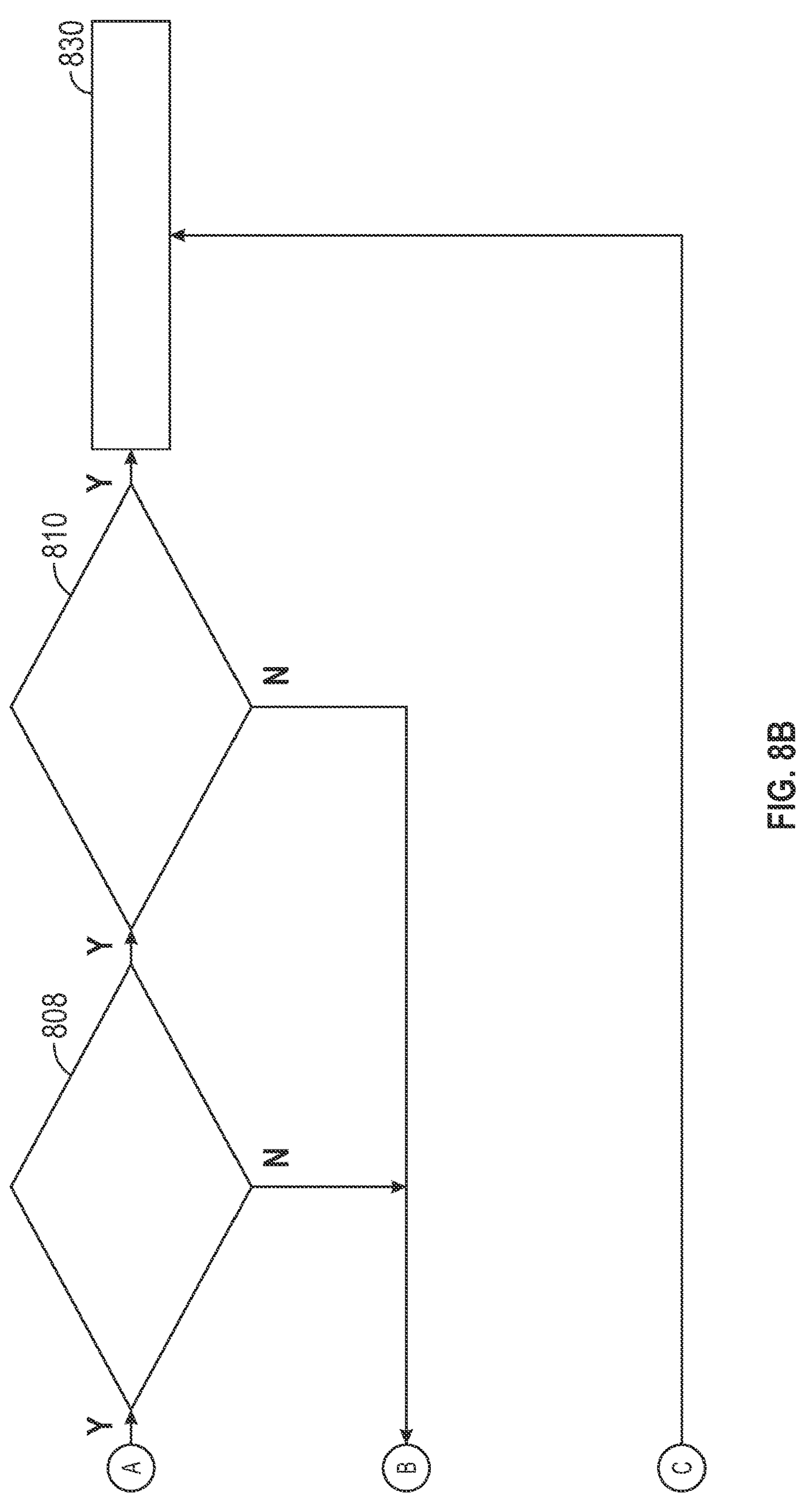

In the example automated rest check subprocess 800 of FIGS. 8A and 8B, the received inputs 520 are analyzed to determine if the passenger 410, 420 is resting. The subprocess 800 includes a series of checks 802, 804, 806, 808, 810, 812, 814 based on image analysis (checks 802, 804, 806, 808, 810) and based on other biometrics (checks 812, 814) from the available inputs 520. The particular checks used in alternative implementations may vary based on available sensors and monitoring inputs 520.

Initially, the subprocess 800 determines if the passenger 410, 420 has closed eyes in a closed eye check 802. The passenger 410, 420 is determined to be not resting when the passenger 410, 420 does not have closed eyes and the subprocess 800 proceeds to a not resting determination 820.

When the passenger 410 420 does have closed eyes, the subprocess 800 proceeds to determine if the passenger 410, 420 is reacting to stimulus in a reaction check 804. If the passenger 410, 420 is reacting to stimulus the reaction check 804 proceeds to the not resting determination 820.

If the passenger 410, 420 is not reacting to stimulus, the subprocess 800 continues analyzing the image using facial recognition processes to determine if the passenger 410, 420 has relaxed facial muscles in a relaxation check 806.

If the facial muscles are not relaxed, the relaxation check 806 proceeds to a heartrate check 812, where the heartrate of the passenger 410, 420 is compared to a resting threshold. When the heartrate is above the resting threshold, the subprocess 800 proceeds to the not resting determination 820.

When the heartrate is at or below the resting threshold, the subprocess 800 proceeds to a rhythmic breathing check 814, where the subprocess 800 determines if the passenger 410, 420 is breathing at a resting rate. If the passenger is breathing faster than the resting rate, the process 800 proceeds to the not resting determination 820. Alternatively, if the passenger 410, 420 is breathing at a resting rate, the subprocess 800 determines that the passenger 410, 420 is resting at a resting determination 830.

Referencing the facial relaxation check 806, when the subprocess determines that the facial muscles of the passenger 410, 420 are relaxed, the subprocess 800 proceeds to determine if the overall body of the passenger 410, 420 is in a relaxed position in a relaxed position check 808. When the passenger 410, 420 is not in a relaxed position, the subprocess 800 proceeds to the heartrate check 812. When the passenger 410, 420 is in a relaxed position (e.g. head down, leaning against a window, etc) the subprocess proceeds to a movement check 810. At the movement check 810, the subprocess determines if the passenger 410, 420 has not moved for longer than a threshold time. If the passenger 410, 420 has not moved, the subprocess proceeds to a resting determination 830. If the passenger has moved within the threshold time, the subprocess 800 proceeds to the heartrate check 812.

When the Automated Rest check 516 also does not identify any passengers as resting (the not resting determination 820), the process 500 returns to the Vehicle Drives step 508, and the process 500 continues looping.

When either the Manual Rest mode Check 514 or the Automated Rest check 516, indicates that one or more passengers 410, 420 are resting (the resting determination 830), the process 500 adjusts the conditions in the passenger compartment 14 according to the additional preference inputs 506 and/or any default resting condition preferences in an Alter At Least One Vehicle condition step 522. In some examples the alterations can include any or all of dimming lights, applying window shades, adjusting the interior temperature, adjusting a position and firmness of the seats 412, 422, playing white noise, active noise canceling, placing vehicle screens and/or third party device screens in a dark mode, altering a volume of at least one third party device, and engaging massage seats. In alternative examples any additional alterations to the passenger compartment 14 experience may be implemented in this step 522. As used herein, third party devices are any devices separate from, and in communication with, the vehicle 10. By way of example, third party devices may include phones, tablets, and/or other smart devices connected to a vehicle infotainment system.

After altering the passenger compartment 14 conditions, the process adjusts the automatic acceleration and deceleration profiles of the current mode of operation in an Adjust Acceleration/Deceleration step 524. In order to improve resting conditions, the process 500 decreases acceleration and deceleration, thereby smoothing the transitions between speeds as the vehicle 10 travels. The acceleration and deceleration rates are referred to as the acceleration profile for the vehicle 10. In some examples, the process 500 likewise adjusts an aggressiveness profile within the step 524 by altering how aggressively the vehicle 10 approaches or handles maneuvering through turns and obstacles.

When the acceleration profile has been set at step 524, the process 500 proceeds to identify the resting body position(s) of each passenger 410, 420 that is resting in an Identify Resting Body Positions step 526. The specific resting body position detection can be performed using any combination of body position inputs 527 including the image feed from the camera 18 system, an occupant detection system (e.g. weight sensors in the vehicle seats 412, 422), a position sensor configured to detect a position of the vehicle seats 412, 422, a passenger compartment motion sensor 14, and/or any similar inputs.

Figure 6:
FIG. 6 depicts an exemplary process for determining an average resting position among all passengers in the vehicle according to one embodiment.
Figure 6:
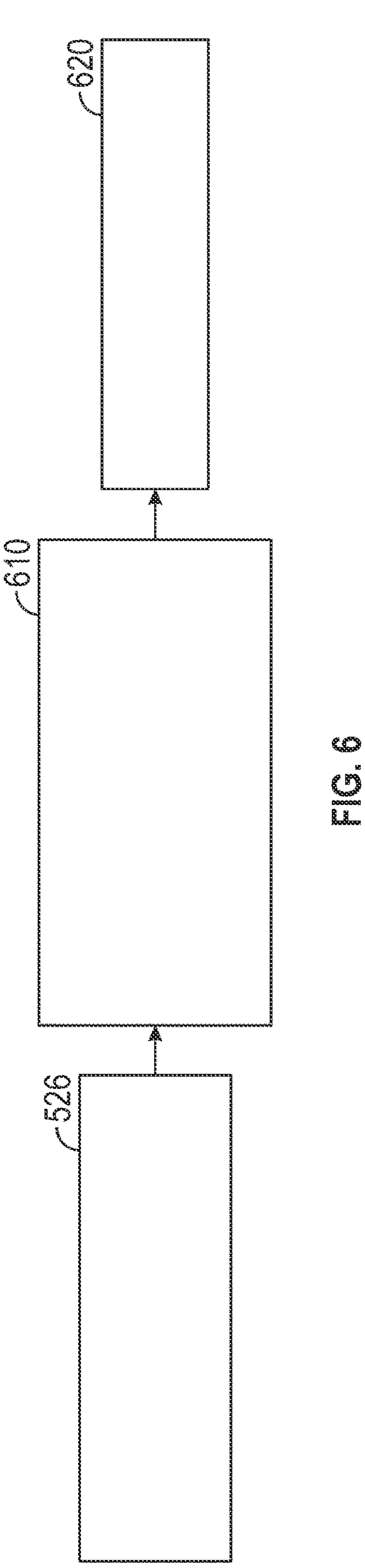
Figure 7:
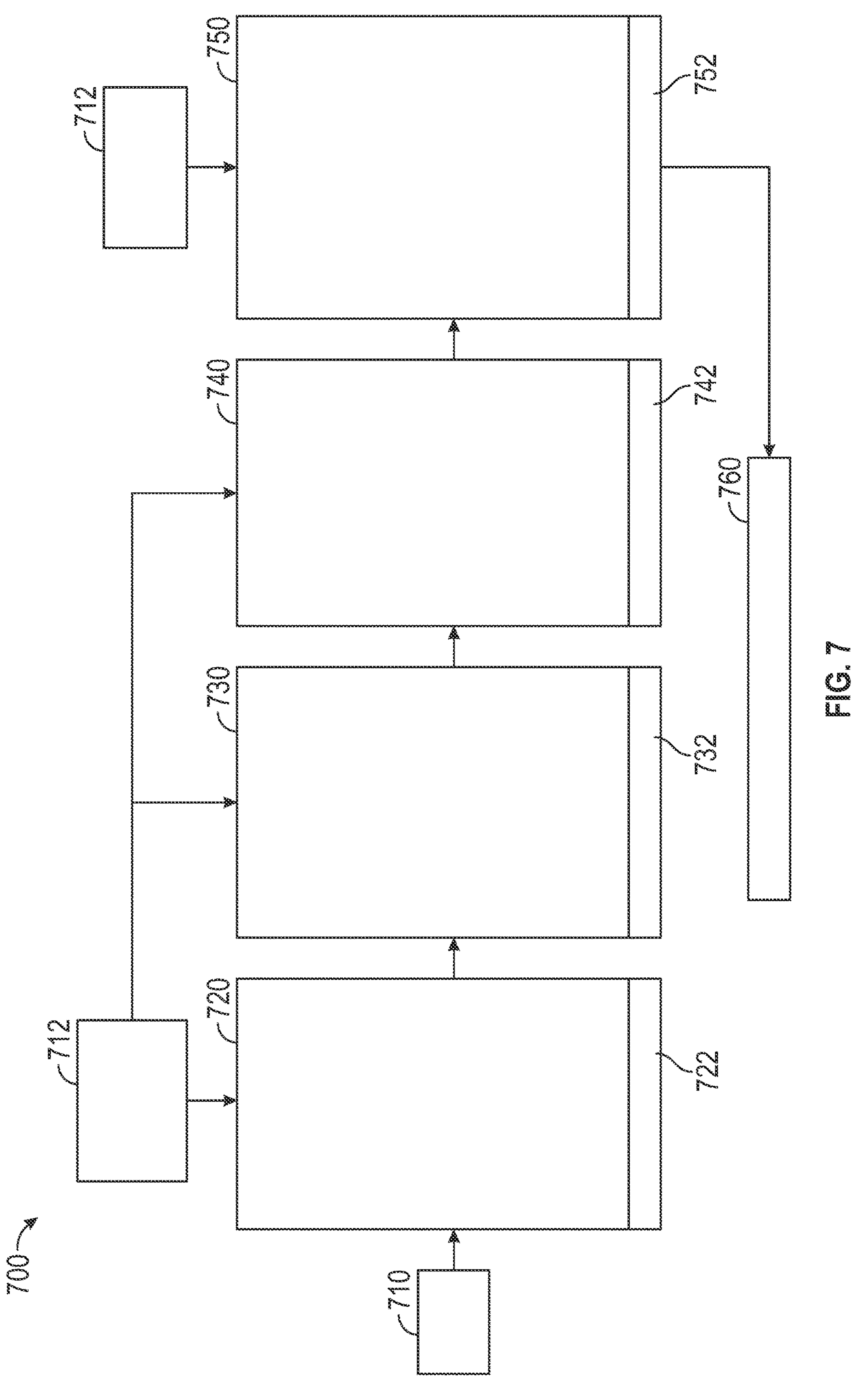
FIG. 7 depicts an exemplary process for determining a rest ability score according to one embodiment.

Once the body positions are identified, the process 500 uses an average rest position sub-process 600 (illustrated in FIG. 6). Within the sub-process 600, a body vector 430, 432 of each resting passenger 410, 420 is identified in an Identify Body Vector step 610 based on the resting body positions identified at step 526. In the illustrated example sub-process 600, each body vector is defined from a vehicle reference point 416, 4126 (a point of origin) and a crown of the corresponding passenger 410, 420. The determined body vectors are then averaged in an Average Body Vector step 620 to provide a singular average body vector for utilization in an upcoming rest ability score subprocess 700 (FIG. 7).

The determined average body vector is provided to a first iteration of the rest ability score subprocess 700, where a rest ability score of the route determined at step 504 as an input 710.

Throughout the iteration of the rest ability score subprocess 700, the controller 22, 24 operating the subprocess 700 receives crowd sourced data 712 from exterior databases. The crowd source data 712 may be retrieved during each iteration of the rest ability score subprocess 700 when a wireless data connection (e.g., cellular data) is available. Alternatively, the crowd sourced data 712 may be retrieved prior to initiation of the trip (step 508) and stored within one or more local memories of the vehicle 10. The databases can include any standard databases, as well as specialized databases including department of transportation construction databases, emergency service location databases, hospital databases, and the like.

Initially, the rest ability score subprocess 700 identifies an expected number and severity of potential high ambient noise areas that will be passed, as well as a duration of time that the route will travel through or by each such area in a Determine Ambient Noise step 720. By way of example, these areas can include construction zones, dense urban populations, police, fire, or other emergency response stations, sporting stadiums and/or any other areas expected to have a high level of ambient noise. A numerical value is assigned to each zone, multiplied by the time in the zone, and the resulting values are summed into an ambient noise of route variable 722 (variable "A").

Then, the rest ability score subprocess 700 identifies a number and severity of expected high-road noise areas, and a duration of time that the route will travel through each such area, in a Determine Road Noise step 730. By way of example, high-road noise areas can include road sections having moderate to sever degradation, bridges, railroad tracks, and/or other known structural features that may lead to high levels of road noise. A numerical value is assigned to each zone, multiplied by the time in the zone, and the resulting values are summed into an expected road noise of route variable 732 (variable "B").

Further, the rest ability score subprocess 700 identifies a number and severity of areas having an expected high level of miscellaneous noise in a Determine Miscellaneous Noise step 740. The miscellaneous noise category captures any expected noise areas or regions not included in the previous two categories, and a numerical value is assigned to each zone, multiplied by the time in the zone, and the resulting values are summed into an expected miscellaneous noise variable 742 (variable "C").

After determining the expected noise based disruptions (steps 720, 730, 740), the rest ability score subprocess 700 identifies a number and severity of areas with high passenger movement potential in a direction counter to the average body vector of the resting passengers 410, 420 in a Determine Average Counter Vector step 750. By way of example, this can include sharp on/off ramps, hard turns, hills or bumps, or other high movement potential areas. In this process, the force of each high passenger movement zone that counters the corresponding body vector and the time in each zone are used to generate an average counter force vector variable 752 (variable "D").

After determining each of the variables 722, 732, 742, 752 a total rest ability score of the route is determined at a Score Determination step 760 according to the following:

$$\text{Rest Ability Score} = 1 - [2 * A + B + C + 5 * D]/[\text{Trip Length}]$$

In the example formula, the high ambient noise variable 722 is applied a weighting factor of 2, and the average counter force vector variable 752 is assigned a weighting factor of 5, representing the expected impact of that variable on the rest ability of a route. In alternative examples, where the vehicle 10 may include further features (such as active noise canceling) the weighting may be adjusted to emphasize or deemphasize particular variables.

Furthermore, in some alternatives additional variables related to rest disruption may be used instead of, or in addition to, the variables 722, 732, 742, 752 described here.

The resultant rest ability score is output to the process 500, and the process 500 proceeds with an Alternate Route Available check 528. If one or more alternate routes are available, the check 528 returns yes, and the alternate routes are processed using the rest ability score subprocess 700. After which, a Rest Ability Comparison check 530 is applied to determine if any of the alternate routes have a higher rest ability score than the initial route 310.

When any of the alternative routes have a higher rest ability score than the initial route, the process 500 determines which alternative route has a highest rest ability score in a Rest Ability Score Comparison step 532. The route having the highest rest ability score is set as the new route and the vehicle continues to follow the new route.

After the completion of step 532, or when the Alternate Route Available check 528 returns no, the process 500 proceeds to a Changed Body Position check 534. In the Changed Body Positions check 534, the process determines if any of the passengers have changed their body position significantly by comparing a current body vector 430, 432 with a stored body vector used to perform the process 500. When the vectors differ by more than a threshold magnitude, it is determined that one or more of the passengers 410, 420 has substantially shifted positions, and the process returns to finding an average rest position using the average rest position sub-process 600.

When no passengers 410, 420 have changed their body position significantly, the process 500 determines if the vehicle 10 is expected to arrive within a user set time preference from the Input Trip Itinerary step 504 at an Arrival Time check 536. If the arrival time is not within the user defined preference, the process 500 discards the current route 310, 320 and returns to the Alternate Route Available check 528.

When the vehicle 10 is expected to arrive within the user set time preference, the process allows the vehicle 10 to continue to travel along the route, and disengages rest mode at a time set by the passengers 410, 420 in the set itinerary step 504, or once the destination has been reached should the destination be reached prior to the set time in a Disengage Rest Mode step 538. After which the process 500 returns to the Destination Reached check 510.

While FIGS. 5-8 describe one potential implementation, it is appreciated that the variations on the process 500 and its associated subprocesses 600, 700, 800 can be made while still falling within the scope of this disclosure.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating a vehicle comprising:

entering a rest mode and altering at least one vehicle condition to be more conducive to rest;

identifying a body position of a first passenger and determining a first vector from the body position to a first vehicle reference point, the first vector being a quantity including a size and a direction;

determining a travel route configured to minimize at least one rest disruption factor based at least in part on the first vector identifying a plurality of potential travel routes, identifying an estimated force vector of each turn of each potential travel route in the plurality of potential travel routes, and selecting the travel route from the plurality of potential travel routes based at least in part on a total opposing force vector between the force vectors of each potential travel route and the first vector; and initiating the determined travel route.

2. The method of claim 1, wherein the body position is a center of a forehead and the first vehicle reference point is a position on a headrest.

3. The method of claim 1, further comprising identifying a second body position of a second passenger and determining a second vector from the body position of the second passenger to a second vehicle reference point.

4. The method of claim 1, wherein the total opposing force vector of each potential route discounts all force vectors below a threshold magnitude.

5. The method of claim 4, wherein the threshold magnitude is a static threshold stored in a vehicle memory.

6. The method of claim 4, wherein the threshold magnitude is a dynamic threshold dependent at least in part on a magnitude of the first vector.

7. The method of claim 1, wherein selecting the travel route is based at least in part on one or more of an expected average speed of each potential route, an expected average roughness of each potential route, an expected noise level of each potential route, and an expected consistency of travel of each expected route.

8. The method of claim 1, wherein altering the at least one vehicle condition includes at least one of altering an interior lighting of the vehicle, altering an interior volume of the vehicle, altering a speed of the vehicle, and altering an aggressiveness of at least one automated vehicle system.

9. The method of claim 8, wherein altering the interior volume includes at least one of lowering an audio output volume, playing a white noise, and actively canceling an exterior noise.

10. The method of claim 8, wherein altering the at least one vehicle condition further includes communicating with at least one third party device, thereby causing the at least one third party device to alter a third party device setting.

11. The method of claim 1, wherein determining the travel route further comprises identifying a targeted arrival time and wherein the determined travel route maximizes expected travel time while completing the determined travel route prior to the targeted arrival time.

12. The method of claim 1, further comprising receiving at least one additional vehicle condition alteration from the first passenger and storing the at least one additional vehicle condition alteration in a memory such that subsequent iterations of the method apply the at least one additional vehicle condition.

13. The method of claim 12, further comprising determining a unique identity of the first passenger and wherein altering the at least one vehicle condition to be more conducive to rest comprises determining rest mode settings of the first passenger using the unique identity of the first passenger and applying the rest mode settings of the first passenger to the vehicle.

14. The method of claim 1, wherein determining the travel route configured to minimize the at least one rest disruption factor based at least in part on the first vector comprises identifying a plurality of potential travel routes, calculating a rest score of each potential travel route, and selecting a potential travel route having a best rest score as the determined travel route.

15. A vehicle comprising:

a controller having at least one automated vehicle operation system configured to cause the controller to perform a method including the steps of entering a rest mode and altering at least one vehicle condition to be more conducive to rest;

identifying a body position of a first passenger and determining a first vector from the body position to a first vehicle reference point, the first vector being a quantity including a size and a direction;

determining a travel route configured to minimize at least one rest disruption factor based at least in part on the first vector by at least identifying a plurality of potential travel routes, identifying an estimated force vector of each turn of each potential travel route in the plurality of potential travel routes, and selecting the travel route from the plurality of potential travel routes based at least in part on a total opposing force vector between the force vectors of each potential travel route and the first vector; and initiating the determined travel route.

16. The vehicle of claim 15, wherein the body position is a center of a forehead and the first vehicle reference point is a position on a headrest.

17. The vehicle of claim 15, wherein determining the travel route comprises identifying a plurality of potential travel routes, calculating a rest score of each potential travel route, and selecting a potential travel route having a best rest score as the travel route.

18. The vehicle of claim 15, wherein the total opposing force vector of each potential travel route discounts all force vectors below a threshold magnitude.

* * * * *